United States Patent
Garfunkel et al.

[11] Patent Number: 6,034,848
[45] Date of Patent: Mar. 7, 2000

[54] LOW PROFILE MULTI-LAYER COIL MERGED THIN FILM MAGNETIC HEAD

[75] Inventors: Glen Adam Garfunkel; Edward Hinpong Lee, both of San Jose; Joseph Francis Smyth, Los Altos; Samuel Wonder Yuan, San Carlos, all of Calif.

[73] Assignee: International Business Machines Corporation, Armonk, N.Y.

[21] Appl. No.: 09/064,932

[22] Filed: Apr. 22, 1998

[51] Int. Cl.[7] .................................. G11B 5/31; G11B 5/39
[52] U.S. Cl. .................................... 360/126; 360/113
[58] Field of Search ................................ 360/126, 113, 360/121, 123

[56] References Cited

U.S. PATENT DOCUMENTS

| | | | |
|---|---|---|---|
| 4,872,079 | 10/1989 | Roberts | 360/126 |
| 5,097,371 | 3/1992 | Somers | 360/113 |
| 5,155,644 | 10/1992 | Kira et al. | 360/113 |
| 5,196,976 | 3/1993 | Lazzari | 360/113 |
| 5,282,308 | 2/1994 | Chen et al. | 29/603 |
| 5,283,942 | 2/1994 | Chen et al. | 29/603 |
| 5,331,728 | 7/1994 | Argyle et al. | 29/603 |
| 5,349,745 | 9/1994 | Kawabe et al. | 29/603 |
| 5,404,635 | 4/1995 | Das | 29/603 |
| 5,435,053 | 7/1995 | Krounbi et al. | 29/603 |
| 5,438,747 | 8/1995 | Kronubi et al. | 29/603 |
| 5,448,822 | 9/1995 | Wu et al. | 29/603 |
| 5,535,079 | 7/1996 | Fukazawa et al. | 360/126 |
| 5,555,147 | 9/1996 | Maruyama | 360/113 |
| 5,621,596 | 4/1997 | Santini | 360/126 |
| 5,642,336 | 6/1997 | Albertini et al. | 369/13 |
| 5,649,351 | 7/1997 | Cole et al. | 29/603.14 |
| 5,793,578 | 8/1998 | Heim et al. | 360/126 |
| 5,867,350 | 2/1999 | Haga et al. | 360/113 |

FOREIGN PATENT DOCUMENTS

| | | |
|---|---|---|
| 04195909 | 7/1992 | Japan . |
| 05334692 | 12/1993 | Japan . |

*Primary Examiner*—Craig A. Renner
*Assistant Examiner*—Angel Castro
*Attorney, Agent, or Firm*—John H. Holcombe

[57] ABSTRACT

Disclosed is a merged thin film magnetic head having a first shield layer and a combined second shield and bottom pole piece layer arranged in a sandwich supporting a read sensor therebetween at the pole tip region. The combined second shield and bottom pole piece layer are magnetically coupled with the first shield layer at the pole tip end of the yoke region adjacent the read sensor, and overlaying and magnetically coupled with the first shield layer at the back gap region. A patterned opening is provided in the combined second shield and bottom pole piece layer at the yoke region thereof to expose the first shield layer and form a flat planarization surface thereon. A plurality of stacked thin film coil layers are provided in the patterned opening, and a top pole piece layer overlies the thin film coil at the yoke region, overlies the bottom pole piece at the pole tip region providing a pole tip and gap thereat, and overlies the bottom pole piece at the back gap region. The patterned opening which exposes the first shield layer allows the provision of a multi-layer coil while maintaining a low profile of the head.

27 Claims, 5 Drawing Sheets

LOW PROFILE MULTI-LAYER COIL MERGED THIN FILM MAGNETIC HEAD

TECHNICAL FIELD

This invention relates to merged thin film magnetic heads, and, more particularly, to merged thin film magnetic heads having multi-layer thin film coil structures in the yoke regions thereof, air bearing sliders and magnetic storage systems employing merged thin film magnetic heads, and the methods for fabricating merged thin film magnetic heads and multi-layer thin film coil structures and air bearing sliders employing merged thin film magnetic heads and multi-layer thin film coil structures.

BACKGROUND OF THE INVENTION

Merged thin film magnetic heads are used to perform both "write" and "read" operations on magnetic media. The write and read operations are performed by separate write and read thin film heads which are merged together in a single thin film structure. Typically, the write head is an inductive structure with a thin film core of ferromagnetic material having a gap with a multi-turn coil wrapped around the thin film core which generates magnetic fields across the gap in response to electrical signals in the coil. The read head is typically a magnetoresistive read sensor which detects magnetic field signals through the resistance changes of the element as a function of the strength of the magnetic flux being sensed by the read sensor.

The merged thin film magnetic head is typically employed to write (or record) data as magnetic signals on a recording surface of a recording media and to read the recorded data as magnetic signals. Examples of recording media include magnetic disks which rotate at high speed, or magnetic tape which is moved in a linear fashion. The merged thin film magnetic head is typically closely spaced from the recording surface, often on an air bearing slider which has an air bearing surface which rides on an air bearing at the surface of a rotating disk, but also as a contact or near contact transducer.

The writing of data is accomplished by a signal in the thin film coil which induces a magnetic flux in the core. The core has two opposed pole pieces which terminate in two pole tips separated by a thin gap. The magnetic flux induced by the coil creates a magnetic field which extends beyond the core at the gap and to the recording media, magnetizing the media. The reading of data is accomplished by a read sensor positioned adjacent the gap and pole pieces and between two shields which "shield" the read sensor from the write flux.

So as to increase the density of data recorded on the recording media, it is desirable to reduce the physical size of the merged thin film magnetic head. But, reducing the size of the head reduces the room available for windings of the thin film coil. The top pole piece of the thin film merged head is formed on top of the thin film coil and is kept as flat as possible and as short as possible between the back gap and pole tip. The typical merged thin film magnetic head has only one layer for the thin film coil and, since the induced magnetic flux is directly related to the number of turns of the coil, has more than one turn of the coil spaced apart in the single layer in the yoke region between the pole tips and the back gap.

As the head is reduced in size, the distance between the pole tips and back gap must also be reduced. To attempt to maintain a plurality of turns for the thin film coil, it would be advantageous to stack the turns in layers. However, each added coil layer raises the coil by the thickness of the layer and of the associated insulation to a substantially greater height than the pole tips and back gap, so that the top pole piece becomes highly sloped (apex angle) towards the pole tip and is also sloped toward the back gap, resulting in a high profile head. As described in coassigned U.S. Pat. No. 5,621,596, Santini, the high apex angle and high sloping layers pose a problem in construction of the head. To reduce the slope angles, the region in the yoke for placement of the thin film coil must be placed a distance away from the pole tip and away from the back gap, lengthening the pole pieces and reducing their efficiency.

SUMMARY OF THE INVENTION

It is an object of the present invention to provide a merged thin film magnetic head with a multi-turn coil in multiple layers while maintaining a low profile.

Disclosed is a merged thin film magnetic head having a first shield layer and a combined second shield and bottom pole piece layer arranged in a sandwich supporting a read sensor therebetween at the pole tip region. The combined second shield and bottom pole piece layer are magnetically coupled with the first shield layer at the pole tip end of the yoke region adjacent the read sensor, and overlaying and magnetically coupled with the first shield layer at the back gap region. A patterned opening is provided in the combined second shield and bottom pole piece layer at the yoke region thereof exposing the first shield layer and forming a flat planarization surface thereon. A plurality of stacked thin film coil layers are provided in the patterned opening, and a top pole piece layer overlies the thin film coil at the yoke region, overlies the bottom pole piece at the pole tip region providing a pole tip and gap thereat, and overlies the bottom pole piece at the back gap region.

The patterned opening which exposes the first shield layer allows the provision of a multi-layer coil while maintaining a low profile of the head.

A magnetic air bearing slider assembly is disclosed with a merged thin film head having a first shield layer and a combined second shield and bottom pole piece layer with a patterned opening in the combined second shield and bottom pole piece layer at the yoke region thereof exposing the first shield layer, a plurality of stacked thin film coil layers in the patterned opening, and a top pole piece layer overlaying the thin film coil at the yoke region, overlaying the bottom pole piece at the pole tip region providing a pole tip and gap thereat, and overlaying the bottom pole piece at the back gap region.

A magnetic data storage system is disclosed in another aspect of the present invention, comprising a magnetic storage medium having at least one track for the recording of data, and a magnetic transducer maintained close to the magnetic storage medium during relative motion therebetween. The transducer includes a patterned opening in the combined second shield and bottom pole piece layer at the yoke region which exposes the first shield layer, so that a plurality of stacked thin film coil layers are provided in the patterned opening, and the top pole piece layer overlies the thin film coil at the yoke region, the bottom pole piece at the pole tip region providing a pole tip and gap thereat, and overlies the bottom pole piece at the back gap region.

Still another aspect of the present invention comprises a method for forming a merged thin film magnetic head, comprising the steps of:

forming a first shield layer having a flat planarization surface;

disposing a read sensor including gap layers on the first shield layer at the pole tip region;

forming a patterned combined second shield and bottom pole piece layer overlaying the read sensor arranged in a sandwich having the read sensor between the first shield layer and the bottom pole tip, the combined second shield layer and bottom pole piece overlaying and magnetically coupled with the first shield layer at the pole tip end of the yoke region, and overlaying and magnetically coupled with the first shield layer at the back gap region, wherein the pattern of the combined second shield and bottom pole piece layer forms an opening in the yoke region thereof exposing the flat planarization surface of the first shield layer;

depositing a plurality of thin film coil layers at the flat planarization surface of the first shield layer; and depositing a top pole piece layer overlaying the thin film coil.

Additionally, a method is disclosed for fabricating an air bearing slider and merged thin film magnetic head comprising the steps of providing a slider substrate having a sensor surface, forming a first shield layer having a flat planarization surface on the sensor surface of the substrate, disposing a read sensor including gap layers on the first shield layer at the pole tip region, forming a patterned combined second shield and bottom pole piece layer, the pattern forming an opening in the yoke region exposing the flat planarization surface of the first shield layer, depositing a plurality of thin film coil layers at the flat planarization surface of the first shield layer, and depositing a top pole piece layer overlaying the thin film coil.

An advantage of the low profile merged magnetic head of present invention is that the region in the yoke occupied by the multi-layer coil is short in length, increasing the efficiency of the yoke.

For a fuller understanding of the present invention, reference should be made to the following detailed description taken in conjunction with the accompanying drawings.

DETAILED DESCRIPTION OF THE INVENTION

Figure 1:
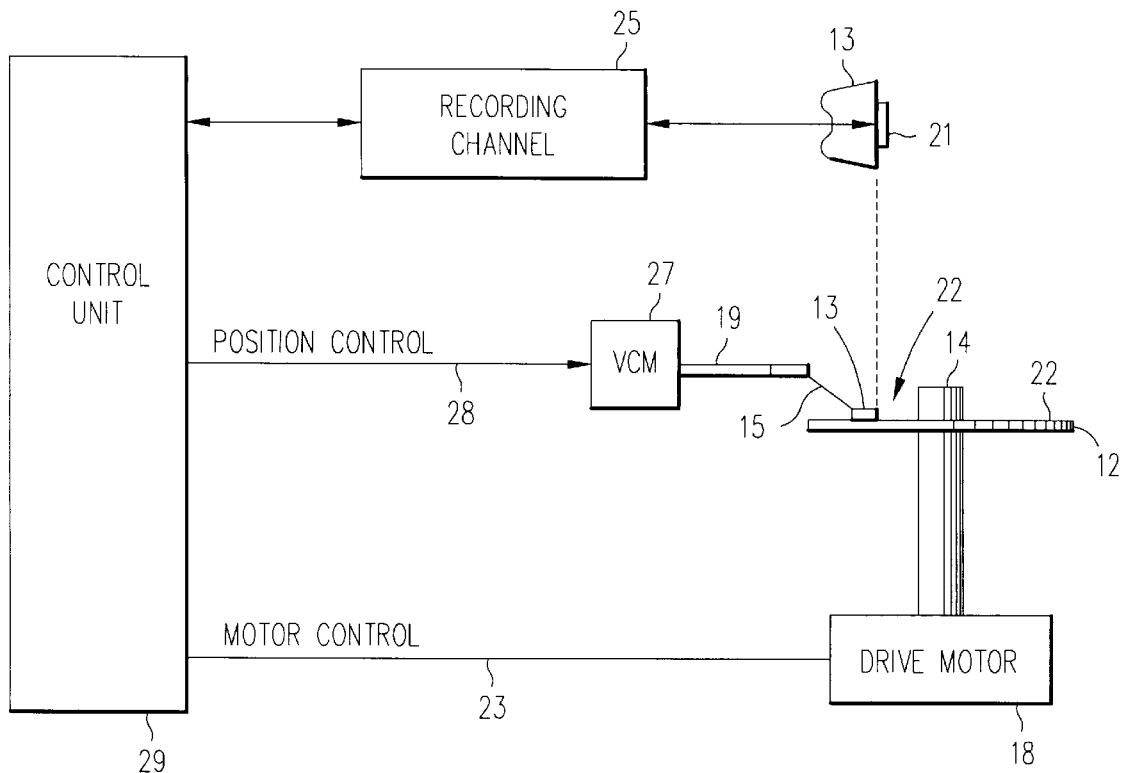
FIG. 1 is a diagrammatic representation of a magnetic disk storage system embodying the present invention.
Figure 2:
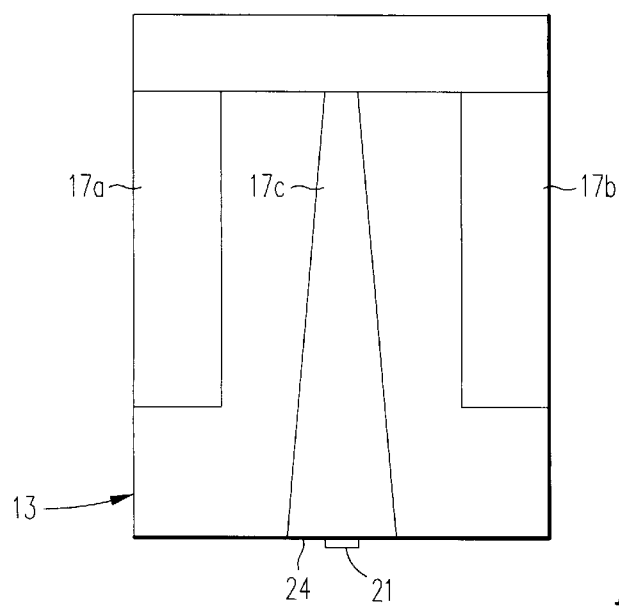
FIG. 2 is a plan view illustration a magnetic air bearing slider embodying the present invention which may be employed in the magnetic disk storage system of FIG. 1.

Referring to FIGS. 1 and 2, although the invention is described as embodied in a magnetic disk storage system as shown in FIGS. 1 and 2, it will be apparent that the invention is also applicable to other magnetic recording systems, for example, such as a magnetic tape recording system. In FIGS. 1 and 2, at least one disk 12 is supported on a spindle 14 and rotated by a disk drive motor 18. A magnetic recording medium is on the surface 22 of the disk 12 and the recorded information is in the form of an annular pattern of concentric data tracks (not shown) on the disk 12.

At least one air bearing slider 13 is positioned on the disk 12, each slider supporting a magnetic read/write transducer 21 on sensor surface 24, typically referred to as a read/write head. Each slider 13 is attached to an actuator arm 19 by means of a suspension 15. The suspension 15 provides a slight spring force which biases the slider 13 against the disk surface 22. Each actuator arm 19 is attached to an actuator 27 which, for example, may be a voice coil motor (VCM). As the disk(s) are rotated, the slider(s) 13 are moved radially in and out over the disk surface 22 by the actuator 27 so that the transducer(s) 21 may access different portions of the disk where desired data is recorded.

During operation of the disk storage system, the rotation of the disk 12 generates an air bearing between air bearing surfaces 17a, 17b and 17c, for example, of the slider 13 and the disk surface 22 which exerts an upward force on the slider. The air bearing thus counterbalances the slight spring force of the suspension 15 and supports the slider 13 and transducer 21 in a closely spaced relationship from the recording medium surface 22 of the disk 12. If the recording medium were tape, the transducer would be in a contact or near contact relationship with the tape.

The various components of the disk storage system are controlled in operation by control signals generated by control unit 29, such as access control signals and internal clock signals. Typically, the control unit 29 comprises logic control circuits, storage or memory, and a microprocessor, for example. The control unit 29 generates control signals to control various system operations such as drive motor control signals on line 23 and head position and seek control signals on line 28. The control signals on line 28 provide the desired current profiles to the voice coil motor 27 to optimally move and position a selected slider 13 to the desired data track on the associated surface 22 of disk 12.

A merged thin film magnetic head in accordance with the present invention forms a part of a transducer, such as the transducer 21. The write head is an inductive structure with a thin film core of ferromagnetic material having a gap with a multi-turn coil wrapped around the thin film core which generates magnetic fields across the gap in response to electrical signals in the coil, magnetizing and recording the data in the surface 22 of the disk 12. The read sensor detects magnetic field signals through the resistance (or conductance) changes of the element as a function of the strength of the magnetic flux being sensed by the element from the recorded signals on the recording medium surface 22. The write and read signals are communicated to and from transducer 21 by means of recording channel 25. The recording channel 25 converts the input data to signals which drive the write element of merged thin film magnetic head to write data on the recording medium 22. A detector of the recording channel 25 is coupled to the merged thin film magnetic head of transducer 21 for detecting changes in the read sensor of the transducer 21 responsive to magnetic fields representative of data bits recorded in the magnetic storage medium 22 intercepted by the sensor element.

The above description of a magnetic disk storage system is for representative purposes only. It should be apparent that disk storage systems may contain a large number of disks, and each actuator may support a large number of sliders and transducers.

Figure 3:
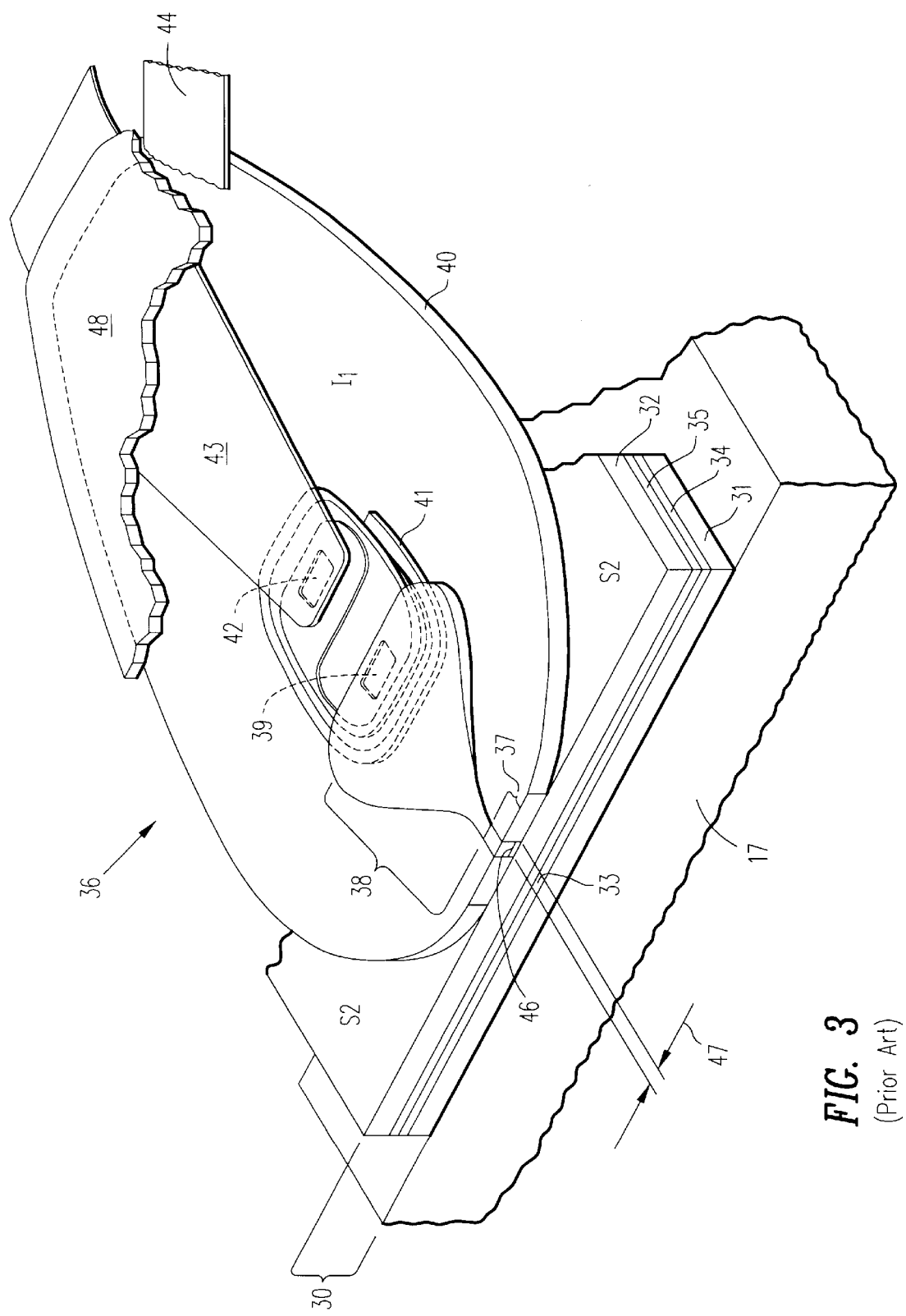
FIG. 3 is an isometric illustration of a prior art merged thin film magnetic head.

FIG. 3 illustrates a conventional merged thin film head with a read head 30 comprising a first shield layer 31 and a second shield layer 32 forming a sandwich for a magnetoresistive read sensor 33 disposed between sandwich dielectric gap layers 34 and 35. The write head 36 has a pole tip region 37 which extends from the air bearing surface 17 of the slider to the yoke region 38 which terminates in a back gap region 39. Typically, the shield layers 31 and 32 extend the full length of the write head so that the second shield layer 32 may form a combined second shield and bottom pole piece layer of the write head. An insulation layer 40 is formed on the combined second shield and bottom pole piece layer 32. A coil 41, having multiple turns in the same layer, e.g. 2–20 turns, is provided on the combined second shield and bottom pole piece layer 32 having one terminal 42 connected to lead 43 and another terminal (not shown) connected to lead 44. A second insulation layer (not shown) overlays the coil 41 and a top pole piece 45 is formed over the insulation layer. The insulation layers are patterned to provide the write pole tips, which are separated by a gap 46. The pole tips and gap determine the track width 47 of the head. A cover layer 48 overlays the head. The provision of multiple turns of coil 41 in the same layer requires a substantial length of the pole pieces 32 and 45 between the pole tip region 37 and the back gap region 39, reducing the efficiency of the write head. However, the multiple turns are required in order to attain a sufficient magnetic flux in the head from the write current in the coil.

To attain the multiple turns while maintaining a short yoke length, it would be advantageous to stack the turns in layers. However, as described above, each added coil layer raises the coil by the thickness of the layer and of the associated insulation to a substantially greater height than the pole tips and back gap, resulting in a high profile head, and the attendant manufacturing problems.

Figure 4A:
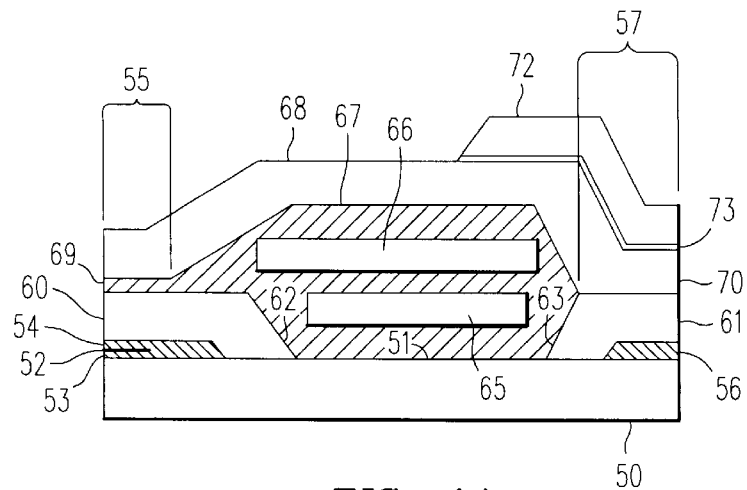
FIGS. 4A and 4B are respectively a cross sectional elevation schematic illustration and a plan schematic illustration of an embodiment of a merged thin film magnetic head in accordance with the present invention.
Figure 4B:
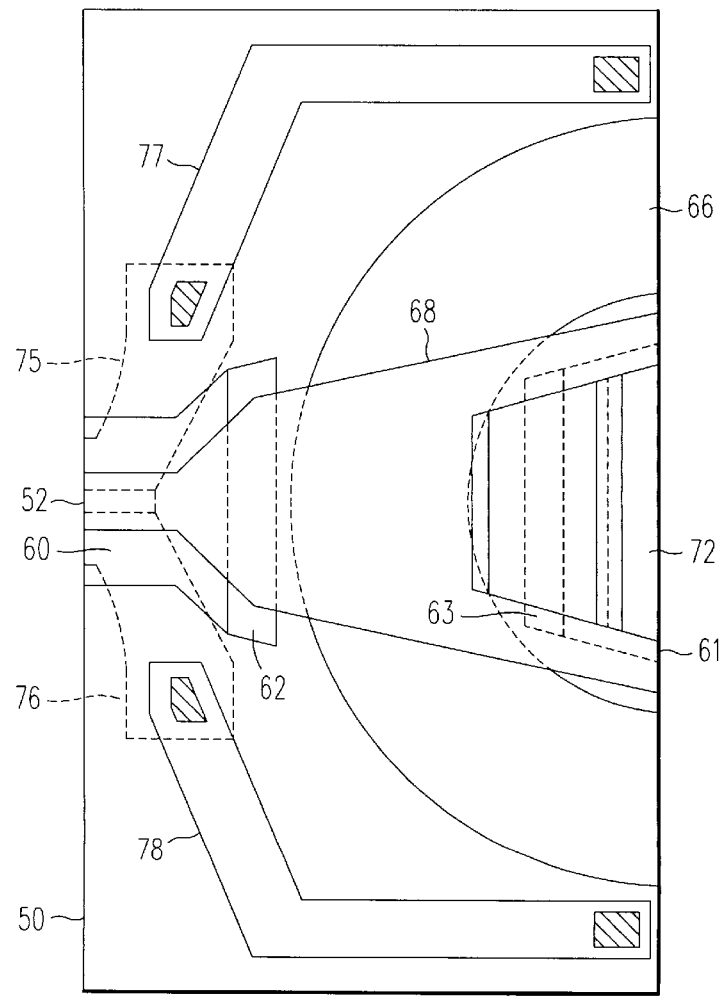

FIGS. 4A and 4B illustrate one embodiment of the low profile multi-layer coil merged thin film magnetic head of the present invention. A first shield layer 50, which may comprise Ni—Fe, is deposited on a substrate, such as the sensor surface 24 of the air bearing slider of FIG. 2. The first shield layer forms a planarization surface 51 in the yoke region of the head, which will be explained in greater detail hereinafter.

A read sensor 52, such as a magnetoresistive read sensor, is formed between sandwich dielectric gap layers 53 and 54 on the first shield layer 50 at the pole tip region 55 of the head. A thin gap layer 56 may be provided at the back gap region 57 of the head, to reduce eddy current loss in that area.

In accordance with the present invention, a patterned combined second shield and bottom pole piece layer 60 and 61 is provided. The patterned combined shield and bottom pole piece layer 60, for example of Ni—Fe, overlays the read sensor 52 and gap layers 53 and 54 to form a sandwich having the read sensor 52 between the first shield layer 50 and the combined second shield and bottom pole piece layer 60 at the pole tip region 55, and the combined second shield and bottom pole piece layer overlays and is magnetically coupled with the first shield layer 50 at the pole tip end of the yoke region, which is between the pole tip region 55 and back gap region 57. The combined second shield and bottom pole piece layer 61 overlays and is magnetically coupled with the first shield layer 50 at the back gap region 57. It will be understood by those of skill in the art that the term "overlay" may or may not imply direct contact between the overlaying and underlying layers and that intermediate layers may be provided.

The pattern of the combined shield and bottom pole piece layer 60 and 61 forms an opening in the yoke region thereof completely therethrough to expose the flat planarization surface 51 of the first shield layer 50. The combined second shield and bottom pole piece layer 60 is tapered 62 towards the flat planarization surface 51, and combined shield and bottom pole piece layer 61 is tapered 63 towards the flat planarization surface. The tapering 62 and 63 are sufficiently shallow to provide good magnetic coupling with the first shield layer 50.

Thus, in accordance with the present invention, the magnetic flux in the combined second shield and bottom pole piece layer 60 and 61 of the write head is coupled through the first shield layer 50, and flat planarization surface 51 comprises a low profile surface for the deposition of the coil layers.

The patterned combined second shield and bottom pole piece layer 60–61 may be formed by depositing a bottom write pole layer on top of a second shield layer and chemically etching the combined second shield and bottom pole piece layer in the yoke region thereof completely therethrough to expose the surface 51 of the first shield layer 50. Alternatively, the patterned combined second shield and bottom pole piece layer 60–61 may be formed by depositing the bottom write pole layer on top of the second shield layer and ion milling the combined second shield and bottom pole piece layer in the yoke region to form the opening completely therethrough to expose the first shield layer 50. As still another alternative, patterned combined second shield and bottom pole piece layer 60–61 may be formed by plating the combined second shield and bottom pole piece layer only in the pole tip region 55 and in the back gap region 57, leaving the yoke region open to expose the flat planarization surface 51 of the first shield layer 50.

The planarization surface 51 allows deposition of the thin film coil on a flat surface without the need for leveling milling or refill.

The coil of the present invention is formed by depositing a plurality of thin film coil layers 65 and 66, and the associated insulation layers 67 on the planarization surface 51 of the first shield layer 50. The coil layers 65 and 66 are preferably copper (Cu) and the insulation layers 67 are preferably photoresist (or dielectric gap materials such as alumina oxide $Al_2O_3$). Thus, the planarization surface 51 provides the flat surface which allows accurate deposition of the coil and the top pole piece.

A top pole piece layer 68, which may also comprise Ni—Fe, is deposited overlaying the thin film coil 65–67, and also overlaying the combined second shield and bottom pole piece layer 60 in the pole tip region 55, forming a write gap 69, the gap preferably formed of $Al_2O_3$. The top pole piece layer also overlies the combined second shield and bottom pole piece layer 61, forming the back gap 70. The long back gap overlap of the top pole piece and the combined second shield and bottom pole piece layer 61 may prevent the backgap from saturating too early, before useful flux can be propagated to the pole tip 55 for data writing. The low profile of the head in accordance with the present invention allows stacked multiple coil layers, while maintaining a low height of the top pole piece 68.

A back gap shaping layer 72, separated from the top pole piece 68 by an insulator layer 73, comprises added materials which are plated or sputtered on top of the top pole piece to strengthen the flux in the back gap region 57 and also prevent the backgap from saturating too early, before useful flux can be propagated to the pole tip 55 for data writing.

Electrical connections to the read sensor 52 are provided by laminated leads 75–78, which overlay the first shield layer (with associated insulation) at each side of the yoke region.

The resultant yoke is short in length, resulting in a high efficiency write head.

Figure 5A:
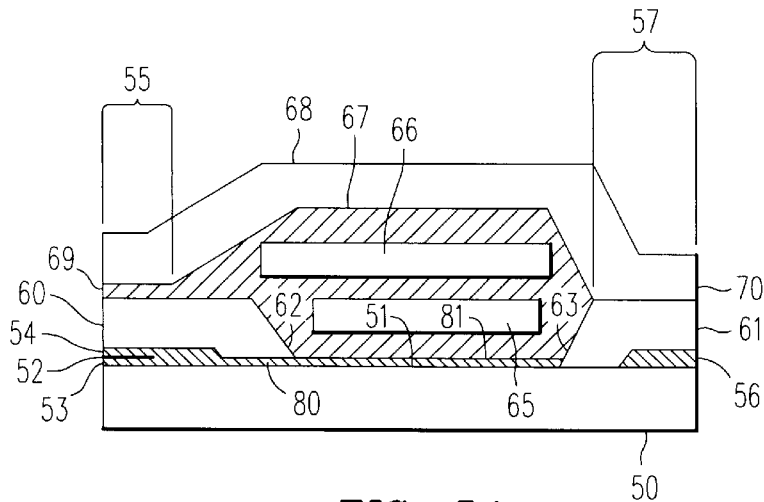
FIGS. 5A and 5B are respectively a cross sectional elevation schematic illustration and a plan schematic illustration of a an alternative embodiment of a merged thin film magnetic head in accordance with the present invention.
Figure 5B:
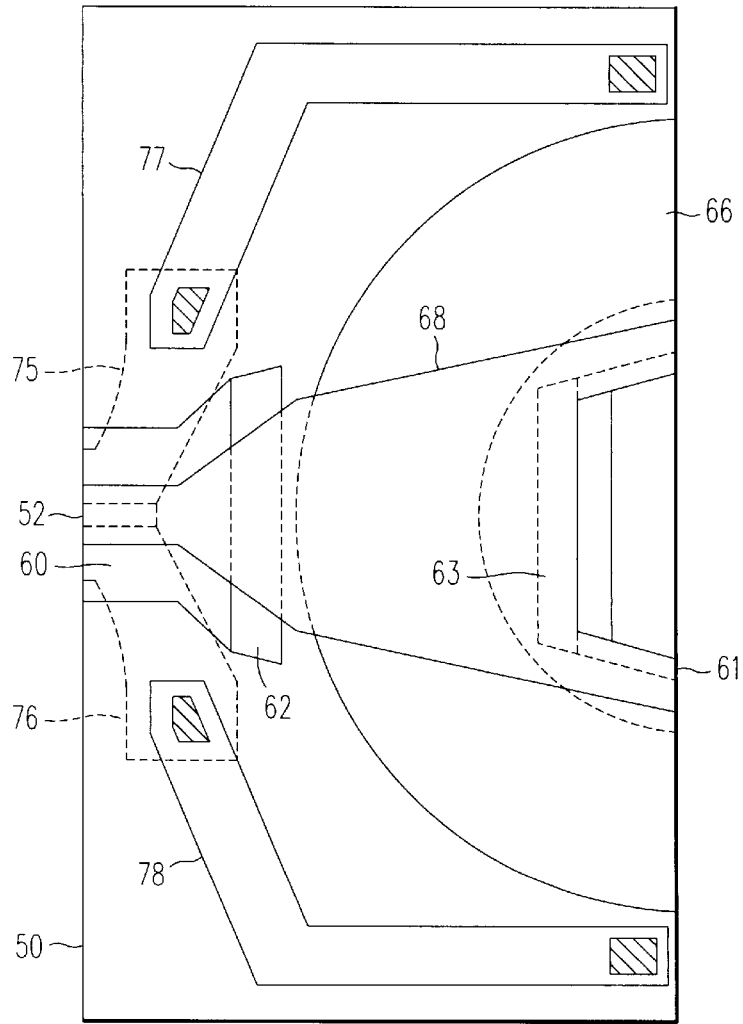

An alternative embodiment is illustrated in FIGS. 5A and 5B wherein an electrical insulation layer 80 is deposited between combined second shield and bottom pole piece layer 60 and the first shield layer 50. The electrical insulation layer may comprise gap material $Al_2O_3$, which is also an electrical insulation. The electrical insulation layer electrically isolates the combined second shield and bottom pole piece layer 60 from the first shield layer 50, opens any electrical current between shield layer 50 and combined second shield and bottom pole piece layer 60, and additionally allows electrical probing to determine whether any short circuit exists between the sensor electrical leads 75–78 and the bottom shield 50, or between the leads and the combined second shield and bottom pole piece layer 60. The electrical insulation layer 80 is sufficiently thin that the combined second shield and bottom pole piece layer 60 and the first shield layer 50 are still magnetically coupled, and this added gap reluctance is small enough so the write efficiency is not affected significantly.

The electrical insulation layer may extend over the planarization surface 51 of the first shield layer 50 and form a surface 81 for the deposition of the coil insulation 67.

Figure 6:
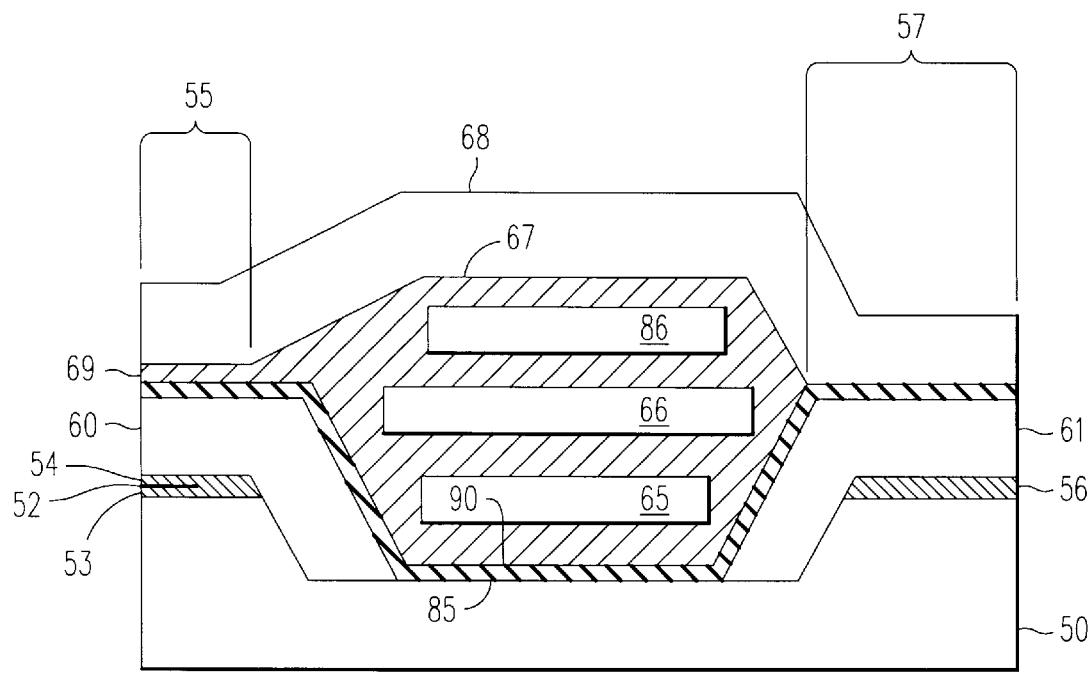
FIG. 6 is a cross sectional elevation schematic illustration of another embodiment of a merged thin film magnetic head in accordance with the present invention.

Still another embodiment is illustrated in FIG. 6, wherein the patterning of the combined second shield and bottom pole piece layer 60 and 61, e.g., by chemical etching or by ion milling, is continued partially into, but not through, the first shield layer 50, forming a flat planarization surface 85. By forming the flat planarization surface 85 into the first shield layer, the profile of the head is further reduced, allowing a third thin film coil layer 86.

As an additional alternative, a layer 90 is provided overlaying the combined second shield and bottom pole piece layer 60 and 61 and the surface 85 of the first shield layer 50. The overlayer 90 may be deposited or plated and comprises sputtered iron-nitrite and alumina in lamination, or a plated Ni—Fe layer with more iron, such as 50%, than the Ni—Fe pole pieces, which are typically 20% iron. The overlayer 90 has a higher magnetic moment than the combined second shield and bottom pole piece layer 60 and 61 and the first shield layer 50. The overlayer 90 improves the saturation characterisitics of the combined second shield and pole piece layer 60 so that, during writing, more flux is conducted through the front gap 69, and less magnetic saturation occurs on the combined second shield and pole piece layer 60 adjacent to the front gap 69. This helps overwrite and reduces hard transition shift, which enhances writing performance.

Figure 7:
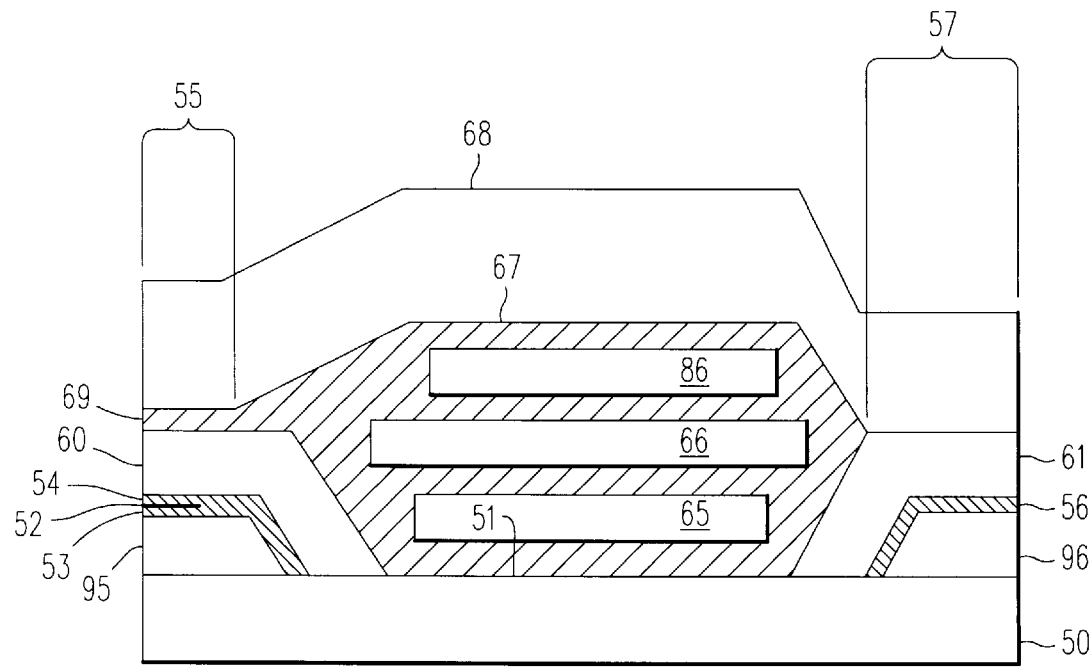
FIG. 7 is a cross sectional elevation schematic illustration of still another embodiment of a merged thin film magnetic head in accordance with the present invention.

Another alternative is illustrated in FIG. 7. A shaped first shield layer is provided at the pole tip region 95 and at the back gap region 96 disposed on the first shield layer 50. The patterned opening additionally extends through the shaped first shield layer 95 and 96 to expose the surface 51 of the first shield layer, thereby increasing the height of the pole tip region 55 of the combined second shield and bottom pole piece layer 60 and the back gap region 57 of the combined second shield and bottom pole piece layer 61, with respect to the first shield layer 50 at the patterned opening. This increased height also allows a third thin film coil layer 86, while maintaining a low profile for the top pole piece layer 68. The flat planarization surface 51 provides the flat surface which allows accurate deposition of the coil and the top pole piece.

All of the above embodiments allow the distance between the read sensor 52 and the write gap 69 (which is primarily deteremined by the thickness of the combined second shield and pole piece layer 60) to be small, which enhances servo performance.

Other alternative arrangements of the flat planarization surface 51, and the generation of the patterned opening in the combined second shield and bottom pole piece layer 60 and 61 to create a low profile for the top pole piece layer 68, may be envisioned by those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. A merged thin film magnetic head having a pole tip region, a yoke region and a back gap region, said yoke region having a pole tip end and a back gap end, comprising:
    a first shield layer;
    a combined second shield and bottom pole piece layer overlaying and magnetically coupled with said first shield layer at said pole tip end of said yoke region, and overlaying and magnetically coupled with said first shield layer at said back gap region;
    a read sensor disposed between said first shield layer and said combined second shield and bottom pole piece layer at said pole tip region;
    a patterned opening in said combined second shield and bottom pole piece layer at said yoke region thereof for exposing said first shield layer and forming a flat planarization surface thereon;
    a plurality of stacked thin film coil layers in said patterned opening on said flat planarization surface; and
    a top pole piece layer overlaying said thin film coil at said yoke region, overlaying said combined second shield and bottom pole piece layer at said pole tip region providing a pole tip and gap thereat, and overlaying said combined second shield and bottom pole piece layer at said back gap region.

2. The merged thin film magnetic head of claim 1, wherein said first shield layer extends to each side of said yoke region, and wherein electrical connections to said read sensor overlay said first shield layer at each side of said yoke region.

3. The merged thin film magnetic head of claim 1, wherein said patterned opening is tapered at said pole tip end and at said back gap end of said yoke region thereof.

4. The merged thin film magnetic head of claim 3, wherein said first shield layer is flat, and said read sensor is positioned on said first shield layer in said pole tip region.

5. The merged thin film magnetic head of claim 3, wherein said head additionally comprises an electrical insulator layer in said yoke region between said first shield and said combined second shield and bottom pole piece layer, electrically separating said layers.

6. The merged thin film magnetic head of claim 3, additionally comprising a shaped top pole piece layer in said back gap region.

7. The merged thin film magnetic head of claim 1, additionally comprising a shaped first shield layer at said pole tip and back gap regions disposed on said first shield layer, and wherein said patterned opening extends through said shaped first shield layer to said first shield layer, thereby increasing the height of said pole tip region and said back gap region with respect to said first shield layer at said patterned opening.

8. The merged thin film magnetic head of claim 1, wherein said patterned opening extends partially into said first shield layer, forming said planarization surface, thereby increasing the height of said pole tip region and said back gap region with respect to said patterned opening in said first shield layer.

9. The merged thin film magnetic head of claim 1, additionally comprising a plated layer overlaying said combined second shield and bottom pole piece layer in said pole tip and back gap regions, and overlaying said first shield layer in said patterned opening.

10. A magnetic air bearing slider assembly, comprising:
   an air bearing slider having a merged thin film magnetic head thereon, said merged thin film magnetic head of the type having a pole tip region, a yoke region and a back gap region, said yoke region having a pole tip end and a back gap end, said merged thin film magnetic head comprising:
   a first shield layer;
   a combined second shield and bottom pole piece layer overlaying and magnetically coupled with said first shield layer at said pole tip end of said yoke region, and overlaying and magnetically coupled with said first shield layer at said back gap region;
   a read sensor disposed between said fist shield layer and said combined second shield and bottom pole piece layer at said pole tip region;
   a patterned opening in said combined second shield and bottom pole piece layer at said yoke region thereof for exposing said first shield layer and forming a flat planarization surface thereon;
   a plurality of stacked thin film coil layers in said patterned opening on said flat planarization surface; and
   a top pole piece layer overlaying said thin film coil at said yoke region, overlaying said combined second shield and bottom pole piece layer at said pole tip region providing a pole tip and gap thereat, and overlaying said combined second shield and said bottom pole piece layer at said back gap region.

11. The magnetic air bearing slider assembly of claim 10, wherein said first shield layer of said merged thin film magnetic head extends to each side of said yoke region, and wherein electrical connections to said read sensor overlay said first shield layer at each side of said yoke region.

12. The magnetic air bearing slider assembly of claim 10, wherein said patterned opening of said merged thin film magnetic head is tapered at said pole tip end and at said back gap end of said yoke region thereof.

13. The magnetic air bearing slider assembly of claim 12, wherein said first shield layer of said merged thin film magnetic head is flat, and said read sensor is positioned on said first shield layer in said pole tip region.

14. The magnetic air bearing slider assembly of claim 12, wherein said merged thin film magnetic head additionally comprises an electrical insulator layer in said yoke region between said first shield and said combined second shield and bottom pole piece layer, electrically separating said layers.

15. The magnetic air bearing slider assembly of claim 12, additionally comprising a shaped top pole piece layer in said back gap region of said merged thin film magnetic head.

16. The magnetic air bearing slider assembly of claim 10, additionally comprising a shaped first shield layer at said pole tip and back gap regions disposed on said first shield layer of said merged thin film magnetic head, and wherein said patterned opening extends through said shaped first shield layer to said first shield layer, thereby increasing the height of said pole tip region and said back gap region with respect to said first shield layer at said patterned opening.

17. The magnetic air bearing slider assembly of claim 10, wherein said patterned opening of said merged thin film magnetic head extends partially into said first shield layer, forming said planarization surface, thereby increasing the height of said pole tip region and said back gap region with respect to said patterned opening in said first shield layer.

18. The magnetic data storage system of claim 10, additionally comprising a plated layer overlaying said combined second shield and bottom pole piece layer in said pole tip and back gap regions of said merged thin film magnetic head, and overlaying said first shield layer in said patterned opening.

19. A magnetic data storage system, comprising:
   a magnetic storage medium having at least one track for the recording of data;
   a magnetic transducer maintained close to said magnetic storage medium during relative motion between the magnetic transducer and said magnetic storage medium, the magnetic transducer including a merged thin film magnetic head, said merged thin film magnetic head of the type having a pole tip region, a yoke region and a back gap region, said yoke region having a pole tip end and a back gap end, said merged thin film magnetic head comprising:
   a first shield layer;
   a combined second shield and bottom pole piece layer overlaying and magnetically coupled with said first shield layer at said pole tip end of said yoke region, and overlaying and magnetically coupled with said first shield layer at said back gap region;
   a read sensor disposed between said first shield layer and said combined second shield and bottom pole piece layer at said pole tip region;
   a patterned opening in said combined second shield and bottom pole piece layer at said yoke region thereof for exposing said first shield layer and forming a flat planarization surface thereon;
   a plurality of stacked thin film coil layers in said patterned opening on said flat planarization surface; and
   a top pole piece layer overlaying said thin film coil at said yoke region, overlaying said combined second shield and bottom pole piece layer at said pole tip region providing a pole tip and gap thereat, and overlaying said combined second shield and said bottom pole piece layer at said back gap region.

20. The magnetic data storage system of claim 19, wherein said first shield layer of said merged thin film magnetic head extends to each side of said yoke region, and wherein electrical connections to said read sensor overlay said first shield layer at each side of said yoke region.

21. The magnetic data storage system of claim 19, wherein said patterned opening of said merged thin film magnetic head is tapered at said pole tip end and at said back gap end of said yoke region thereof.

22. The magnetic data storage system of claim 21, wherein said first shield layer of said merged thin film magnetic head is flat, and said read sensor is positioned on said first shield layer in said pole tip region.

23. The magnetic data storage system of claim 21, wherein said merged thin film magnetic head additionally comprises an electrical insulator layer in said yoke region between said first shield and said combined second shield and bottom pole piece layer, electrically separating said layers.

24. The magnetic data storage system of claim 21, additionally comprising a shaped top pole piece layer in said back gap region of said merged thin film magnetic head.

25. The magnetic data storage system of claim 19, additionally comprising a shaped first shield layer at said pole tip and back gap regions disposed on said first shield layer of said merged thin film magnetic head, and wherein said patterned opening extends through said shaped first shield layer to said first shield layer, thereby increasing the height of said pole tip region and said back gap region with respect to said first shield layer at said patterned opening.

26. The magnetic data storage system of claim 19, wherein said patterned opening of said merged thin film magnetic head extends partially into said first shield layer, forming said planarization surface, thereby increasing the height of said pole tip region and said back gap region with respect to said patterned opening in said first shield layer.

27. The magnetic data storage system of claim 19, additionally comprising a plated layer overlaying said combined second shield and bottom pole piece layer in said pole tip and back gap regions of said merged thin film magnetic head, and overlaying said first shield layer in said patterned opening.

* * * * *